United States Patent [19]
Day et al.

[11] Patent Number: 6,031,063
[45] Date of Patent: Feb. 29, 2000

[54] METHOD FOR ENHANCING CRYSTALLINITY OF POLYCARBONATES

[75] Inventors: James Day, Scotia, N.Y.; Bhaskar Bhairavnath Idage, Pune, India; Andrew James Caruso, Schenectady, N.Y.

[73] Assignee: General Electric Company, Schenectady, N.Y.

[21] Appl. No.: 09/370,434

[22] Filed: Aug. 9, 1999

[51] Int. Cl.[7] .................................................. C08G 64/00
[52] U.S. Cl. ........................................... 528/196; 528/198
[58] Field of Search ..................... 528/196, 198

[56] References Cited

U.S. PATENT DOCUMENTS

| | | | |
|---|---|---|---|
| 4,948,871 | 8/1990 | Fukuoka | 528/481 |
| 5,204,377 | 4/1993 | Fukawa et al. | 521/60 |

OTHER PUBLICATIONS

Copending U.S. Patent Application Serial No. 08/986,448, filed Dec. 8, 1997, by Bhaskar B. Idage et al., entitled "Method of Preparing Polycarbonates by Solid State Polymerization".

*Primary Examiner*—Terressa M. Boykin
*Attorney, Agent, or Firm*—Robert T. Barker; Noreen C. Johnson

[57] ABSTRACT

The crystallinity of an amorphous precursor polycarbonate is enhanced by contact in the liquid or vapor state with a non-solvent which may be water, an alkanol or a mixture thereof and which is dialkyl carbonate-free. Contact temperatures are at least about 75° C. and are further defined by the relationship $$T_c \geq T_b - z,$$

wherein $T_c$ is the contact temperature, $T_b$ is the boiling point of the non-solvent at the contact pressure employed (both in degrees C.) and z is a constant whose value is 60.

20 Claims, No Drawings

METHOD FOR ENHANCING CRYSTALLINITY OF POLYCARBONATES

BACKGROUND OF THE INVENTION

This invention relates to polycarbonates, and more particularly to a method for enhancing their crystallinity.

Solid state polymerization of polycarbonates is disclosed, for example, in U.S. Pat. Nos. 4,948,871, 5,204,377 and 5,214,073, the disclosures of which are incorporated herein. It involves three steps: a first step of forming a prepolymer, typically by melt polymerization (i.e., transesterification) of a dihydroxyaromatic compound such as bisphenol A with a diaryl carbonate such as diphenyl carbonate; a second step of crystallizing the prepolymer; and a third step of building the molecular weight of the crystallized prepolymer by heating to a temperature between its glass transition temperature and its melting temperature. Use of this polymerization method is of increasing interest by reason of its effectiveness and environmental benefits.

The second or crystallization step of this method is performed, according to said patents, by solvent treatment or heat treatment. As described, the solvent treatment method may in fact employ a good or poor solvent for the prepolymer, with contact involving either the liquid or vapor form thereof. Illustrative "solvents" include aliphatic aromatic hydrocarbons, ethers, esters, ketones and halogenated aliphatic and aromatic hydrocarbons. It is considered important that the "solvent" be allowed to permeate into the prepolymer. The described methods of crystallization apparently require that the crystallinity of the entire prepolymer mass be increased to a value of at least 5% as determined from powder X-ray diffraction patterns.

Copending, commonly owned application Ser. No. 08/986,448 describes a solid state polymerization method which requires only surface crystallization of the precursor polycarbonate. Surface crystallization is effected by contact, typically at a temperature in the range of about 20–50° C., with at least one dialkyl carbonate, optionally in the presence of another non-solvent such as water or a $C_{1-4}$ alkanol.

A problem frequently encountered in these SSP processes is interadhesion of the polycarbonate particles prior to the SSP step, which inhibits polymerization. Another problem is that prepolymers in the form of pellets, which are a common physical form in which they are collected, often cannot be efficiently polymerized or disintegrate to fines during the SSP step.

It would be desirable, however, to employ non-solvents which are not as expensive and difficult to obtain as dialkyl carbonates. It would further be desirable to achieve crystallization to the desired degree by a method which can be performed on readily available precursor polycarbonate pellets and the like.

SUMMARY OF THE INVENTION

The present invention provides a method for crystallization enhancement which may be performed on precursor polycarbonates with the use of very inexpensive materials. It is applicable to polycarbonates in powder form and in the form of larger aggregates, including pellets, which are efficiently polymerized without disintegration to fines and without adhesion between pellets.

One aspect of the invention is a method for enhancing the crystallinity of a solid, amorphous aromatic precursor polycarbonate which comprises contacting said precursor polycarbonate with at least one non-solvent therefor, said non-solvent being water or a $C_{1-20}$ alkanol in the liquid or vapor state and being free from dialkyl carbonate, for a time effective to form a surface-crystallized polycarbonate and at a contact temperature and pressure, said contact temperature being at least about 75° C. and being further defined by the relationship $$T_c \geq T_b - z,$$

wherein $T_c$ is the contact temperature, $T_b$ is the boiling point of the on-solvent at the contact pressure employed (both in degrees C.) and z is a constant whose value is 60.

Another aspect is a method for preparing an aromatic polycarbonate which comprises polymerizing the enhanced crystallinity precursor polycarbonate thus produced by solid state polymerization.

DETAILED DESCRIPTION; PREFERRED EMBODIMENTS

Polycarbonates which may be prepared by the method of this invention typically comprise structural units of the formula

(I)

wherein at least about 60% of the total number of R groups are aromatic organic radicals and the balance thereof are aliphatic, alicyclic, or aromatic radicals. Preferably, each R is an aromatic organic radical and more preferably a radical of the formula

(II)

wherein each $A^1$ and $A^2$ is a monocyclic divalent aryl radical and Y is a bridging radical in which one or two carbonate atoms separate $A^1$ and $A^2$. Such radicals are derived from dihydroxyaromatic compounds of the formulas HO—R—OH and HO—$A^1$—Y—$A^2$—OH respectively. For example, $A^1$ and $A^2$ generally represent unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred polycarbonates are those derived entirely or in part from 2,2-bis(4-hydroxyphenyl) propane, also known as "bisphenol A".

The essential starting material in step A of the method of this invention is a precursor polycarbonate. It may be a polycarbonate oligomer of the type produced by the first step of a melt polycarbonate process or by bischloroformate oligomer preparation followed by hydrolysis and/or endcapping and isolation. Such oligomers most often have a weight average molecular weight (Mw) in the range of about 2,000–10,000 as determined by gel permeation chromatography which may be relative to polycarbonate or polystyrene, and an intrinsic viscosity in the range of about 0.06–0.30 dl/g, all intrinsic viscosity values herein being as determined in chloroform at 25° C.

Both homopolymer and copolymer precursor polycarbonates may be employed. Copolycarbonates include those containing, for example, bisphenol A carbonate structural units in combination with carbonate units derived from other bisphenols or from polyethylene glycols. Also included are copolyestercarbonates, such as those containing bisphenol dodecanedioate units in combination with carbonate units.

It may also be a relatively high molecular weight polycarbonate, generally having an Mw value in the range of about 10,000–35,000, for which it is desired to increase the molecular weight still further; e.g., up to a value in the range of about 50,000–80,000. For example, optical quality polycarbonate which is off-specification may be crystallized by the method of this invention prior to increasing its molecular weight so that it may be used in other applications.

The precursor polycarbonate may be a branched homo- or copolycarbonate, formed by the reaction of a linear polycarbonate or its precursor(s) with a branching agent such as 1,1,1-tris(4-hydroxyphenyl)ethane. Branched copolycarbonates include oligomers and high molecular weight copolycarbonates containing units adapted to maximize solvent resistance. Hydroquinone and methylhydroquinone carbonate units are particularly suitable for this purpose, as disclosed in U.S. Pat. No. 4,920,200. Such units will typically comprise about 25–50% of total carbonate units in the polymer. Conversion to the branched homo- or copolycarbonate may precede or occur simultaneously with the conversion of the precursor polycarbonate to an enhanced crystallinity polymer.

The precursor polycarbonate may also be a recycled polycarbonate. For example, recycled polymer from compact disks may be employed. Its method of original preparation is immaterial; i.e., recycled polycarbonate originally prepared by interfacial polymerization, by melt polymerization or from bischloroformates may be employed.

Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or other art-recognized procedures for separation of non-polycarbonate constituents. Other types of polycarbonate, such as interfacially prepared polycarbonate and polycarbonate extruder wastes, may also be employed as precursors.

Prior to performing step A, it is within the scope of the invention, particularly when the precursor polycarbonate is a recycled material, to dissolve it in a chlorinated hydrocarbon as solvent. Illustrative chlorinated hydrocarbons are methylene chloride, chloroform, 1,2-dichloroethane, chlorobenzene and o-dichlorobenzene. The chloroaliphatic hydrocarbons are preferred, with methylene chloride and 1,2-dichloroethane being most preferred.

Dissolution of the precursor polycarbonate in the solvent may take place at any temperature. Typical temperatures are from about 0° C. to the boiling point of the solvent, with about 20–100° C. generally being preferred. So long as an amount of solvent effective to dissolve the polycarbonate is employed, its proportion is not critical.

Such dissolution generally leaves behind various insoluble materials, as illustrated by metallic coatings when the precursor polycarbonate is from optical disks, for example. The invention further contemplates removal of said insoluble materials from the polycarbonate solution. This may be achieved by such conventional operations as decantation, filtration and centrifugation.

The recycled polycarbonate is frequently associated with colored impurities, which may appear in the polycarbonate itself or in the solution thereof in the chlorinated solvent. Various embodiments of the invention, therefore, include a step of removing color from the amorphous polycarbonate solution following other removal steps. One method for color discharge is treatment while in solution with a mineral acid, preferably hydrochloric acid, said acid typically being in solution in an alkanol such as methanol. Another is contact of said solution with a solid that absorbs color bodies, such as activated charcoal or a crosslinked resin, which may be neutral or may be an ion exchange resin. Another is washing with a solution of sodium gluconate. Still another is washing of the resin, after precipitation as described hereinafter, with non-solvent in an amount sufficient to dissolve color bodies.

The solution of precursor polycarbonate is, for the most part, freed of any solvent prior to crystallization enhancement. It is usually advantageous to precipitate the precursor polycarbonate therefrom by such art-recognized methods as anti-solvent precipitation or steam precipitation.

According to the invention, the precursor polycarbonate is contacted with at least one non-solvent therefor, selected from the group consisting of water and $C_{1-20}$ alkanols. Among alkanols, the preferred species are $C_{1-5}$ primary alkanols, as illustrated by methanol, ethanol and 1-butanol. Certain secondary alkanols, such as 2-butanol and 3-pentanol, are also excellent choices. Mixtures of non-solvents may also be employed. The most preferred non-solvents, by reason of their availability and low cost, are water, methanol and mixtures thereof.

For the purposes of the present invention, it is neither necessary nor contemplated to employ a dialkyl carbonate as required in the aforementioned application Ser. No. 08/986, 448. One of the features of the method of this invention is that it is not necessary for such relatively expensive compounds to form part of the non-solvent. The use of such simple materials as water and alkanols is sufficient.

Contact of the precursor polycarbonate with the non-solvent is at a contact temperature which is at least 75° C. and which is further defined by the relationship $$T_c \geq T_b - z,$$

wherein $T_c$ is the contact temperature, $T_b$ is the boiling point of the non-solvent at the contact pressure employed (both in degrees C.) and z is a constant. The maximum value of z is 60. Preferably, z is 20.

The non-solvent may, at the point of contact with the precursor polycarbonate, be in the liquid or vapor state. Liquid contact is most often effected by submerging the precursor polycarbonate in a bath of the non-solvent, and vapor contact by passing the vapors of the non-solvent upward through a bed of the precursor polycarbonate. It is within the scope of the invention for the contact temperature to be greater than $T_b$, especially when vapor contact is employed, whereupon the pressure of the contact vessel must be maintained above atmospheric pressure. Elevated pressures up to about 10 atm are typical, with pressures up to about 5 atm being preferred. The contact temperature may also be above the glass transition temperature of the precursor polycarbonate.

The time required for contact with the non-solvent will depend on the rate of crystallinity enhancement and will vary according to the non-solvent employed and the conditions of contact. Optimum times can be determined by simple experimentation. For the most part, times in the range of about 15–60 minutes are sufficient.

Crystallinity enhancement according to this invention is substantially as described in the aforementioned copending application Ser. No. 08/986,448, in that only surface enhancement is necessary. It is most often found, however, that the non-solvent swells the particles of precursor polycarbonate, especially when said particles are pellets, and permeates beyond the surface. Crystallinity levels of 5% by weight or greater are typically achieved.

It is often found that polycarbonate oligomers are so brittle they cannot be conveniently extruded and pelletized unless extrusion is into a liquid medium such as water. The present invention contemplates extrusion under ambient temperature and pressure conditions into a non-solvent which is capable of enhancing crystallization under such conditions, as exemplified by methanol, after which pelletization and crystallinity enhancement may be achieved simultaneously.

Following crystallinity enhancement, the precursor polycarbonate is easily recovered since, having been contacted with a non-solvent, it is in the same physical form as previously except for an increase in crystallinity and, possibly, some wetting with the non-solvent. It may then be, and preferably is, subjected to art-recognized solid state polymerization conditions. These include a temperature between the glass transition temperature and the melting temperature of the enhanced crystallinity polycarbonate, most often about 10–50° C. below its melting temperature. In general, temperatures in the range of about 150–270° and especially about 180–250° C. are suitable, especially for bisphenol A homopolycarbonates.

The method of the invention is illustrated by the following examples.

EXAMPLES 1–13

The crystallization apparatus consisted of a pressurizable vessel serving as a liquid reservoir and a sample holding screen of adjustable height, adapted to be submerged in liquid in the reservoir or positioned in the space above the liquid. This vessel was charged with methanol and samples of amorphous bisphenol A polycarbonate pellets (about 4 mm diameter) were placed on the screen, which was then positioned as desired. The vessel was heated as desired and, when appropriate, was sealed so as to produce an autogenous pressure of vapors therein. The polycarbonate samples were exposed to the liquid or its vapors for a period of time, after which crystallinity was determined.

The results are given in the following table. The polycarbonate samples were of bisphenol A homopolycarbonate further identified as follows:

Oligomer: Mw about 3,800.

OQ: optical quality, Mw about 34,000.

TABLE I

| Ex. | Polymer | Methanol liquid (L) or vapor (V) | Temp., ° C. | Pressure, atm | Time, min | Crystallinity, % |
|---|---|---|---|---|---|---|
| 1 | OQ | V | 130 | 8.5 | 60 | 9.5 |
| 2 | OQ | V | 130 | 8.5 | 15 | 4.1 |
| 3 | Oligomer | L | 80 | 1.4 | 30 | 21 |
| 4 | Oligomer | V | 100 | 3.6 | 120 | 22.7 |
| 5 | Oligomer | V | 100 | 3.7 | 60 | 19.7 |
| 6 | Oligomer | V | 100 | 3.6 | 45 | 19.3 |
| 7 | Oligomer | V | 100 | 3.6 | 60 | 22 |
| 8 | Oligomer | L | 80 | 1.7 | 60 | 22 |
| 9 | Oligomer | L | 80 | 1.7 | 15 | 9 |
| 10 | Oligomer | V | 120 | 5 | 15 | 22.7 |
| 11 | Oligomer | V | 130 | 8.5 | 60 | 23 |
| 12 | Oligomer | V | 140 | 9.5 | 60 | 23 |
| 13 | Oligomer | V | 150 | 11.2 | 15 | 22.8 |

As shown by Example 2, 15 minutes is not quite adequate under these conditions to afford a suitably crystalline sample of OQ polycarbonate. However, 60 minutes is adequate (Example 1) and 15 minutes at even lower temperature is adequate when an oligomer is employed (Example 10).

EXAMPLES 14–26

The procedure of Examples 1–13 was repeated, using various liquids and various forms of polycarbonate. The results are given in Table II.

TABLE II

| Ex. | Polymer | Form | Non-solvent liquid (L) or vapor (V) | Temp., ° C. | Pressure, atm | Time, min | Crystallinity, % |
|---|---|---|---|---|---|---|---|
| 14 | Oligomer | Powder | Methanol L | 80 | 1.7 | 25 | 21 |
| 15 | Oligomer | Pellets | Ethanol L | 78 | 1.0 | 30 | 16.5 |
| 16 | Oligomer | Pellets | 1-Propanol L | 80 | 1.6 | 20 | 0.8 |
| 17 | Oligomer | Pellets | 1-Butanol V | 110 | 1.0 | 30 | 12 |
| 18 | Oligomer | Pellets | 2-Butanol L | 97 | 1.6 | 30 | 15.7 |
| 19 | OQ | Pellets | 2-Butanol L | 97 | 1.6 | 900 | 22 |
| 20 | Oligomer | Powder | 3-Pentanol L | 105 | 1.0 | 30 | 30 |
| 21 | Oligomer | Crushed "rocks", 6 mm | 3-Pentanol V | 110 | 1.0 | 30 | 12.1 |
| 22 | Oligomer | Pellets | 3-Hexanol L | 105 | 1.0 | 20 | 22 |
| 23 | OQ | Pellets | 3-Hexanol L | 120 | 1.0 | 900 | 26.2 |
| 24 | Oligomer | Pellets | Water L | 152 | 4.8 | 60 | 26 |
| 25 | Oligomer | Pellets | Water L | 135 | 3.1 | 60 | 0 |
| 26 | Oligomer | Pellets | Water/methanol 1:1 (wt.) L | 105 | 1.7 | 60 | 20 |

Substantial enhancements in crystallinity were noted in all of these examples except Example 16 using 1-propanol and Example 25 using water. It is believed that an increase in contact time in Example 16 and in temperature in Example 25 would have resulted in increased crystallinity.

EXAMPLES 27–28

The procedure of Examples 1–13 was employed to enhance the crystallinity of two copolycarbonates:

Example 27: 98.5 mole percent bisphenol A, 1.5 mole percent polyethylene glycol (mol. wt. 400);

Example 28: 98 mole percent bisphenol A, 2 mole percent polyethylene glycol (mol. wt. 200).

In each example, methanol vapor was employed at 100° C. and the contact time was 60 minutes. Products having crystallinity values in the range of 22–28% were obtained.

What is claimed is:

1. A method for enhancing the crystallinity of a solid, amorphous aromatic precursor polycarbonate which comprises contacting said precursor polycarbonate with at least one non-solvent therefor, said non-solvent being water or a $C_{1-20}$ alkanol in the liquid or vapor state and being free from dialkyl carbonate, for a time effective to form a surface-crystallized polycarbonate and at a contact temperature and pressure, said contact temperature being at least about 75° C. and being further defined by the relationship $$T_c \geq T_b - z,$$

wherein $T_c$ is the contact temperature, $T_b$ is the boiling point of the non-solvent at the contact pressure employed (both in degrees C.) and z is a constant whose value is 60.

2. A method according to claim 1 wherein the precursor polycarbonate is a homopolycarbonate.

3. A method according to claim 1 wherein the precursor polycarbonate is a copolycarbonate.

4. A method according to claim 3 wherein the precursor polycarbonate is a copolyestercarbonate.

5. A method according to claim 1 wherein the precursor polycarbonate is a bisphenol A homo- or copolycarbonate.

6. A method according to claim 1 wherein the precursor polycarbonate is an oligomer having a weight average molecular weight in the range of about 2,000–10,000 as determined by gel permeation chromatography.

7. A method according to claim 1 wherein the precursor polycarbonate has a weight average molecular weight in the range of about 10,000–35,000 as determined by gel permeation chromatography.

8. A method according to claim 1 wherein the precursor polycarbonate is a branched polycarbonate.

9. A method according to claim 1 wherein the precursor polycarbonate is a recycled polycarbonate.

10. A method according to claim 1 wherein the non-solvent is water.

11. A method according to claim 1 wherein the non-solvent is a $C_{1-5}$ primary alkanol.

12. A method according to claim 1 wherein the non-solvent is methanol.

13. A method according to claim 12 wherein the precursor polycarbonate is an oligomer which is extruded into methanol and pelletized, thereby achieving simultaneous pelletization and crystallinity enhancement.

14. A method according to claim 1 wherein the non-solvent is water or a mixture of water and methanol.

15. A method for enhancing the crystallinity of a solid, amorphous aromatic precursor polycarbonate which comprises contacting said precursor polycarbonate with at least one non-solvent therefor, said non-solvent being water or a $C_{1-20}$ alkanol in the liquid or vapor state and being free from dialkyl carbonate, for a time effective to form a surface-crystallized polycarbonate and at a contact temperature and pressure, said contact temperature being at least about 75° C. and being further defined by the relationship $$T_c \geq T_b - z,$$

wherein $T_c$ is the contact temperature, $T_b$ is the boiling point of the non-solvent at the contact pressure employed (both in degrees C.) and z is a constant whose value is 20.

16. A method according to claim 15 wherein the contact pressure is atmospheric pressure or an elevated pressure up to about 5 atm.

17. A method for preparing an aromatic polycarbonate which comprises:

enhancing the crystallinity of a solid, amorphous aromatic precursor polycarbonate which comprises contacting said precursor polycarbonate with at least one non-solvent therefor, said non-solvent being water or a $C_{1-20}$ alkanol in the liquid or vapor state and being free from dialkyl carbonate, for a time effective to form a surface-crystallized polycarbonate and at a contact temperature and pressure, said contact temperature being at least about 75° C. and being further defined by the relationship $$T_c \geq T_b - z,$$

wherein $T_c$ is the contact temperature, $T_b$ is the boiling point of the non-solvent at the contact pressure employed (both in degrees C.) and z is a constant whose value is 60; and polymerizing the enhanced crystallinity precursor polycarbonate thus produced by solid state polymerization.

18. A method according to claim 17 wherein the precursor polycarbonate is a bisphenol A homo- or copolycarbonate.

19. A method according to claim 17 wherein the non-solvent is water.

20. A method according to claim 17 wherein the non-solvent is water, methanol or a mixture thereof.

* * * * *